US012771191B1

(12) United States Patent
Milheim

(10) Patent No.: US 12,771,191 B1
(45) Date of Patent: Oct. 20, 2026

(54) HUB SUPPORT RING FOR AXIAL FLUX MOTORS

(71) Applicant: E-Circuit Motors, Inc., Needham Heights, MA (US)

(72) Inventor: George Harder Milheim, Bozeman, MT (US)

(73) Assignee: E-Circuit Motors, Inc., Needham Heights, MA (US)

( * ) Notice: Subject to any disclaimer, the term of this patent is extended or adjusted under 35 U.S.C. 154(b) by 0 days.

(21) Appl. No.: 19/231,126

(22) Filed: Jun. 6, 2025

Related U.S. Application Data

(60) Provisional application No. 63/789,512, filed on Apr. 16, 2025.

(51) Int. Cl.
*H02K 1/2713* (2022.01)
*H02K 1/12* (2006.01)
*H02K 15/40* (2025.01)

(52) U.S. Cl.
CPC ............. *H02K 1/2713* (2013.01); *H02K 1/12* (2013.01); *H02K 15/40* (2025.01)

(58) Field of Classification Search
CPC ......... H02K 1/2713; H02K 1/12; H02K 15/40
See application file for complete search history.

(56) References Cited

U.S. PATENT DOCUMENTS 5,485,046 A * 1/1996 Kaplan .................. H02K 37/02 310/166
7,109,625 B1 9/2006 Jore et al.
8,922,093 B2 12/2014 Crocker
9,673,688 B2 6/2017 Shaw
9,800,109 B2 10/2017 Shaw
10,170,953 B2 1/2019 Shaw
10,211,694 B1 2/2019 Shaw
11,005,322 B2 5/2021 Milheim et al.
11,121,614 B2 9/2021 Milheim
11,336,130 B1 5/2022 Shaw et al.
11,342,813 B2 5/2022 Steg et al.
(Continued)

FOREIGN PATENT DOCUMENTS

CN 114123586 A 3/2022
CN 114765388 A 7/2022
(Continued)

OTHER PUBLICATIONS

International Search Report and Written Opinion mailed Jul. 16, 2026, for International Patent Application No. PCT/US2026/023584.

*Primary Examiner* — Joseph Ortega
(74) *Attorney, Agent, or Firm* — Pierce Atwood LLP

(57) ABSTRACT

A rotating assembly for an axial flux machine may include first and second rotor plates, a hub component, and a support. The second rotor plate may be oriented generally parallel to the first rotor plate and the hub component may extend between a first region of a first axial face of the first rotor plate and a second region of a second axial face of the second rotor plate. The support may extend between a third region of the first axial face and a fourth region of the second axial face, the third region being located radially outward from the first region with respect to the axis of rotation and the fourth region being located radially outward from the second region with respect to the axis of rotation.

23 Claims, 2 Drawing Sheets

(56) References Cited

U.S. PATENT DOCUMENTS

| | | | |
|---|---|---|---|
| 11,527,933 B2 | 12/2022 | Shaw et al. | |
| 11,594,929 B2 | 2/2023 | Yao et al. | |
| 11,626,779 B2 | 4/2023 | Shaw et al. | |
| 11,751,330 B2 | 9/2023 | Milheim et al. | |
| 11,876,406 B2 | 1/2024 | Duan et al. | |
| 2024/0097520 A1 | 3/2024 | Wu et al. | |
| 2026/0088671 A1* | 3/2026 | Wik | H02K 1/2791 |

FOREIGN PATENT DOCUMENTS

| | | | |
|---|---|---|---|
| CN | 119675372 | A | 3/2025 |
| CN | 119787725 | A | 4/2025 |
| EP | 4412056 | A1 | 8/2024 |
| WO | 2021096767 | A1 | 5/2021 |
| WO | 2023043669 | A1 | 8/2023 |
| WO | 2023143669 | A1 | 8/2023 |

* cited by examiner

HUB SUPPORT RING FOR AXIAL FLUX MOTORS

RELATED APPLICATIONS

This application claims the benefit under 35 U.S.C. § 119(e) of U.S. Provisional Application Ser. No. 63/789,512, entitled HUB SUPPORT RING FOR AXIAL FLUX MOTORS, filed Apr. 16, 2025, the entire contents of which are incorporated herein by reference for all purposes.

BACKGROUND

Axial flux motors and generators described by several patents, including U.S. Pat. Nos. 7,109,625; 9,673,688; 9,800,109; 10,170,953; 10,211,694; 11,005, 322; 11,121, 614; 11, 336,130; 11,527,933; 11,626,779; 11,751,330, the entire contents of which are incorporated herein by reference, feature a generally planar printed circuit board stator (PCB) assembly interposed between magnets magnetized with alternating north-south poles.

DETAILED DESCRIPTION

Figure 1:
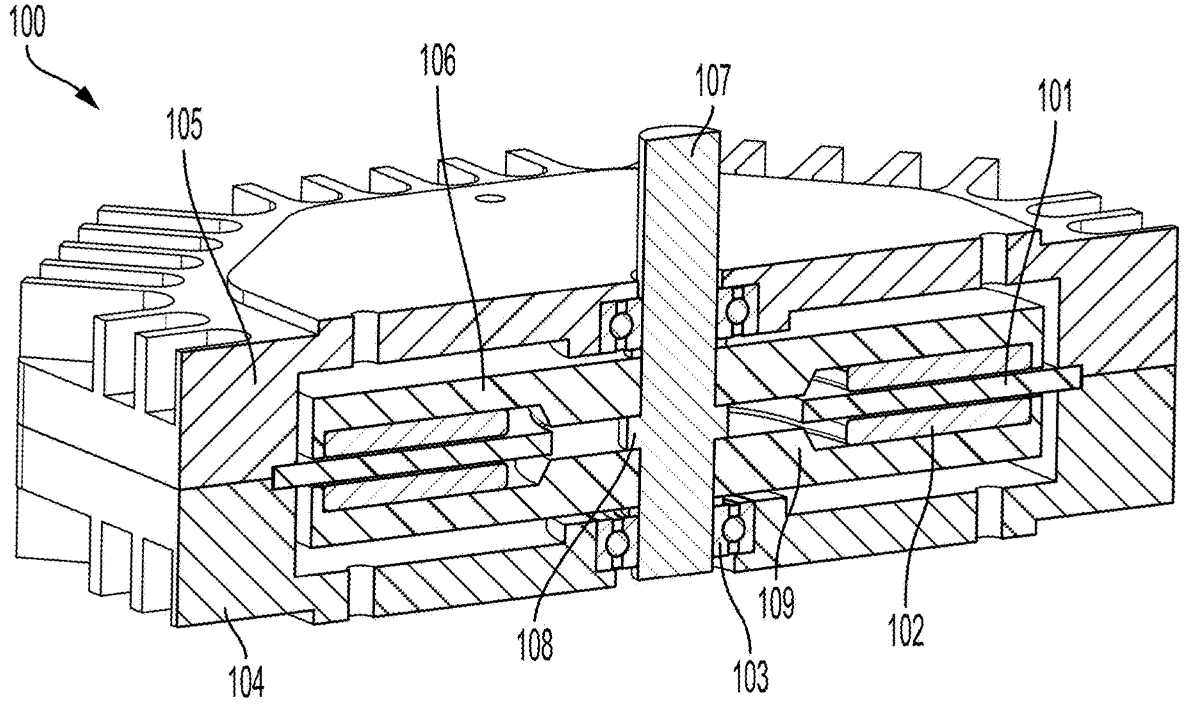
FIG. 1 shows a cutaway view of a conventional axial flux machine.

FIG. 1 illustrates a configuration a conventional axial flux machine 100 (e.g., a motor or generator) that employs a generally planar stator 101 (e.g., a PCB stator) of the type disclosed in the above-referenced patents. As shown in FIG. 1, magnets 102 are typically fastened to rotor plates 106 to form rotor assemblies which are spaced apart from one another by a hub component 108 which is attached to or integral with a shaft 107. As illustrated, the stator 101 may be held stationary with respect to a housing (e.g., including a top housing portion 105 attached to a bottom housing portion 104), and bearings 103 may allow rotation of the rotor assemblies (including the rotor plates 106 and the magnets 102) and the shaft 107 relative to the stator 101 and the housing. The hub component 108 must support the rotor plates 106, resolve the attractive force between the magnets 102, and maintain a constant separation between the rotor assemblies and the stator 101.

Offered is a support ring 212 (shown in FIGS. 2 and 3) which can be placed around the outside of a hub component to resolve the constant axial force in an axial flux permanent magnet machine. As explained in more detail below, the support ring 212 may allow the use of low-cost materials and/or manufacturing techniques for a shaft and/or a hub component that, absent the support ring 212, would not be able to maintain dimensional consistency under the axial load. In effect, the support ring 212 and hub/shaft component(s) may form a composite structure, where the support ring 212 is designed to resist the components of force that would otherwise cause creep. One benefit of using such a support ring 212 is the ability to use low-cost, mass manufacturing techniques while maintaining precision control over the gap dimension in an axial flux machine.

As noted above, in conventional designs, the rotor plates 106 of an axial flux machine 100 are typically held apart and located using a hub component 108. As illustrated in FIG. 1, in some such designs, the hub component 108 may be a step which is integral to the shaft 107. Such a step is typically small in diameter, as the shaft 107 is frequently machined from a single piece of material. In such configurations, the rotor plates 106 may include thicker regions 109 near their centers to resolve the bending stress due to the attractive force of the magnets 102.

In other designs, the hub component 108 may include a separately manufactured hub part which is thermal fit or press fit onto the shaft 107 so that the torque of the machine 100 may be transferred through the tight fit between the shaft 107 and the hub part. In such designs, to be able to adequately support the rotor assemblies (including the rotor plates 106 and the magnets 102), the diameter of the shaft 107 and the diameter of the bore in such a hub part must both be tightly controlled to achieve a fit which is strong enough to transfer the torque and support the rotor assemblies and yet still allow the hub component to be assembled onto the shaft 107. These tightly controlled dimensions make the parts expensive to manufacture.

For a number of reasons, it may be desirable to make a shaft and hub component as a single-piece, homogenous component formed of a polymer or composite material with a polymer matrix, such as glass filled nylon, as these materials are inexpensive and easy to form into complex geometries with accurate dimensions, e.g., by injection molding. Unfortunately, in many cases, these materials are subject to creep, which is the tendency of a solid material to deform slowly over time under a constant stress. Polymers and polymer composites can be particularly prone to creep. A polymer or polymer composite part may thus change dimensionally over time under load and at room temperature. In many uses of polymer components, creep may be negligible, as constant stresses may be small, large stresses may be applied for short periods of time, or the dimensional change may be small enough to not impact the usefulness of the part over its lifetime. If a polymer or polymer composite is used to make the hub component 108, however, the creep of the material over time may cause the magnets 102 to move closer together. The magnetic force increases as the distance between the magnets 102 decreases so the material of the hub component 108 may continue to creep until the magnets 102 and stator 101 touch. Other mechanical loads that the hub/shaft typically supports may cause stresses which are much smaller than the stress caused by the magnetic attraction force and the small amount of deformation due to creep may be acceptable. These loads would include supporting the mass of the rotor plates 106 against gravity and transferring torque to the output portion of the shaft 107.

The present disclosure relates a support ring that may be made from a material that has significantly less creep than the material used to make the shaft and/or hub component of an axial flux machine (e.g., when such components are subjected to mechanical stress within a normal range of operating temperatures of the axial flux machine, e.g., between 0 and 250 degrees Fahrenheit), such as where the shaft and hub component are integrally formed as a single-piece component using an injection molding process or the like. In some implementations, the support ring may be made of a metal (e.g., aluminum or steel) or a metal alloy, as such materials have high yielding stress and exhibit negligible creep.

Figure 2:
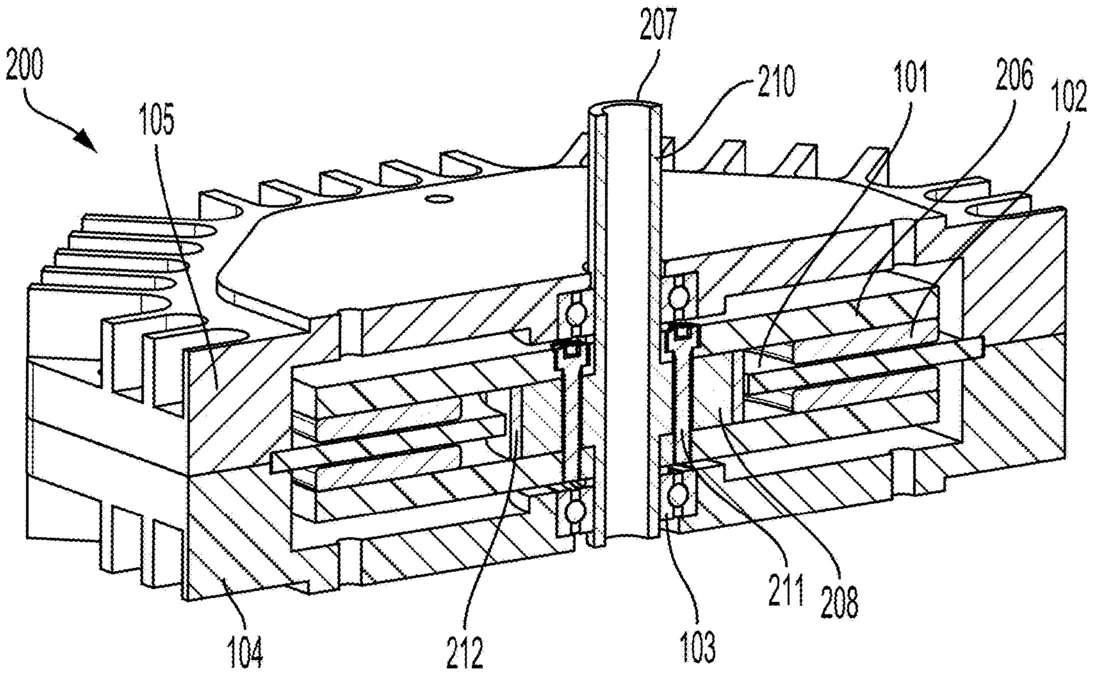
FIG. 2 shows a cutaway view of an axial flux machine including a hub component and associated support ring, in accordance with some embodiments of the present disclosure.
Figure 3:
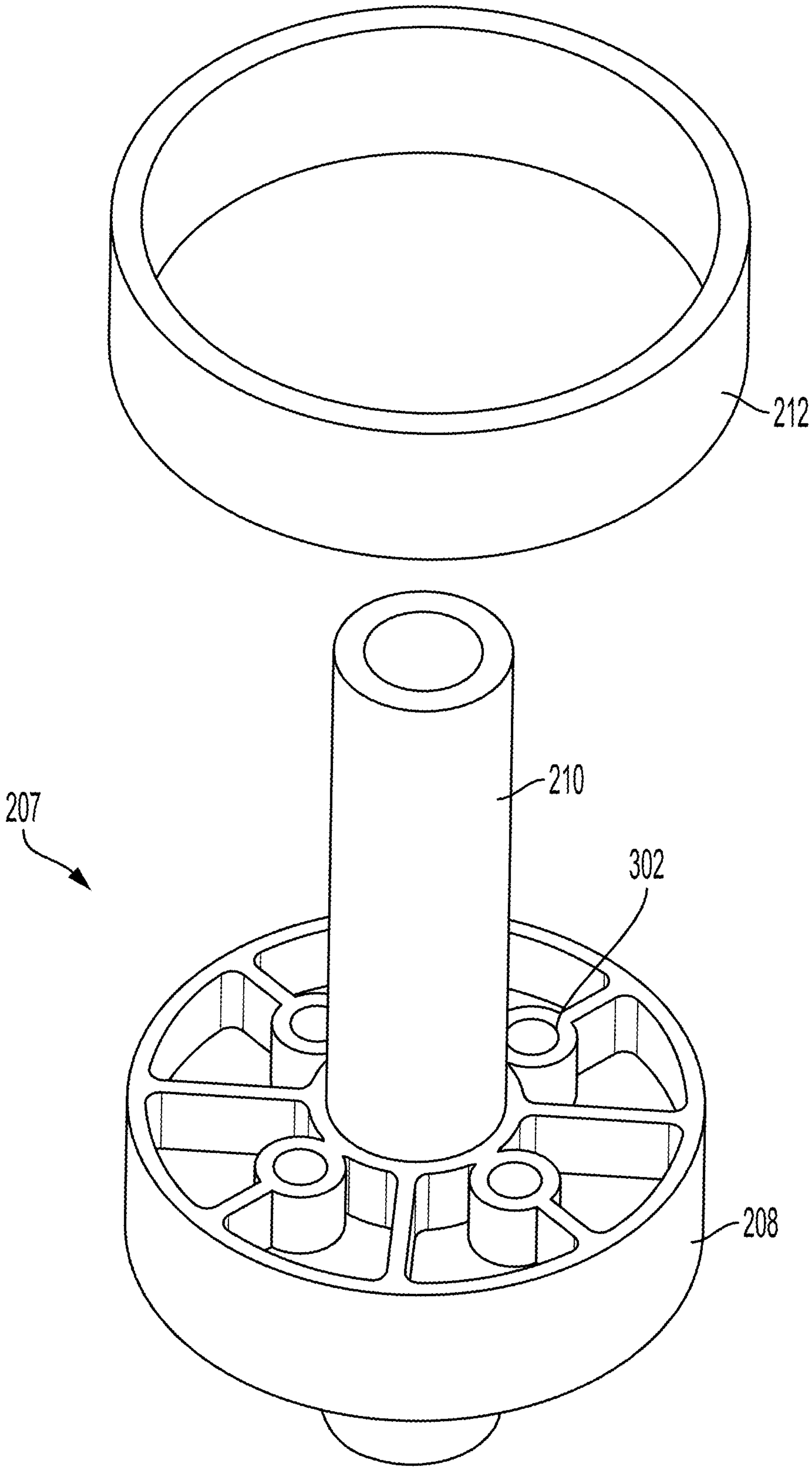
FIG. 3 shows the hub component and support ring that are included the axial flux machine shown in FIG. 2.

FIG. 2 shows an example axial flux machine 200 (e.g., a motor or generator) that employs such a support ring 212 and an associated shaft/hub component 207. FIG. 3 shows the shaft/hub component 207 and the support ring 212 separated from the axial flux machine 200. In some implementations, the shaft/hub component 207 may be a homogenous, single-piece structure (e.g., formed using an injection molding process) that includes both a shaft portion 210 and a hub portion 208. In some implementations, the shaft/hub component 207 may be composed of a material which may be easily formed into the hub/shaft shape, such as a polymer, a composite material with a polymer matrix (e.g., a glass reinforced nylon material), or similar. In some implementations, the material used for the shaft/hub component 207 may have a significantly lower melting point than the material used for the support ring 212, which makes it more cost effective to mold into a complex three-dimensional shape.

Similar to the conventional axial flux machine 100 shown in FIG. 1, the axial flux machine 200 may include a stator 101 (e.g., a PCB stator) that is held stationary with respect to a housing (e.g., including a top housing portion 105 attached to a bottom housing portion 104), as well as bearings 103 that allow rotation of rotor assemblies (including rotor plates 206 and magnets 102) relative to the stator 101 and the housing.

In some implementations, the support ring 212 may be used only to space the rotor plates 206 and resolve the axial force between the magnets 102. In some implementations, the only critical dimension of the support ring 212 is its thickness in the axial direction. The fit of the support ring 212 around the hub portion 208 of the shaft/hub component 207 can be loose, as the clamping force of the rotor plates 206 in the axial direction may hold the support ring 212 firmly in place. The shape of the support ring 212 may be easy to manufacture, for example, by extrusion, with the critical thickness dimension being machined to the appropriate size. In an assembly including both the shaft/hub component 207 and the support ring 212, the hub portion 208 of the shaft/hub component 207 may establish the perpendicularity of the rotor plates 206 to the shaft portion 210 while the support ring 212 may control the spacing between the rotor plates 206.

In some implementations, the support ring 212 may be manufactured to be slightly thinner in the axial direction than hub portion 208 of the shaft/hub component 207. In some such implementations, when the rotor plates 206 are assembled onto the hub portion 208, the rotor plates 206 may compress the hub portion 208 (which is typically a softer material than the support ring). In other such implementations, over time the hub portion 208 may be compressed due to creep to allow the rotor plates 206 to contact the support ring 212. The support ring 212 may thereafter prevent further deformation of the hub portion 208. In this way, the hub portion 208 can establish the perpendicular relationship between the shaft portion 210 and the rotor plates 206 while the support ring 212 can control the axial gap between the rotor plates. In some implementations, fasteners 211 (e.g., screws) may be used to secure the hub portion 208 and the support ring 212 between the rotor plates 206. In some implementations, the support ring 212 may include holes 302 (shown in FIG. 3) to accommodate such fasteners 211.

In other implementations, the support ring 212 may be made to be slightly thicker in the axial direction than the hub portion 208, and fasteners 211 (e.g., screws) may be used to fasten the rotor plates 206 such that they deform inward at their inner diameters to clamp both the hub portion 208 and the support ring 212 firmly in place.

In some implementations, the support ring 212 may additionally or alternatively be incorporated into the molding process for the hub/shaft component 207 such that it is permanently attached. In other implementations, the support ring 212 may additionally or alternatively be fixed to the hub portion 208 with an adhesive after the hub/shaft component 207 is manufactured. In still other implementations, the support ring 212 may additionally or alternatively be manufactured to have a slot which allows the support ring 212 to expand such that it may be tightly fit around the hub portion 208. A support ring 212 of this type may be formed, for example, by bending a strip of material into the ring shape.

As shown in FIG. 2, when a support ring 212 of the type described herein is employed, the rotor plates 206 need not include thicker regions near their centers (like the thicker regions 109 of the rotor plates 106 shown in FIG. 1) to resolve the bending stress due to the attractive force of the magnets 102, and may thus be significantly easier and less expensive to manufacture than the rotor plates 106 used in conventional axial flux machines.

The following clauses describe examples of apparatuses and methods that embody various aspects of the present disclosure.

Clause 1. A rotating assembly for an axial flux machine, comprising: a first rotor plate configured to rotate about an axis of rotation; a second rotor plate configured to rotate about the axis of rotation, the second rotor plate being oriented generally parallel to the first rotor plate; a hub component extending between a first region of a first axial face of the first rotor plate and a second region of a second axial face of the second rotor plate; and a support extending between a third region of the first axial face and a fourth region of the second axial face, the third region being located radially outward from the first region with respect to the axis of rotation and the fourth region being located radially outward from the second region with respect to the axis of rotation.

Clause 2. The rotating assembly of clause 1, wherein: the hub component is made of a first material; and the support is made of a second material that experiences substantially less creep than the first material when subjected to mechanical stress within a normal range of operating temperatures of the axial flux machine.

Clause 3. The rotating assembly of clause 2, wherein the first material includes a polymer.

Clause 4. The rotating assembly of clause 3, wherein the first material is a composite material with a polymer matrix.

Clause 5. The rotating assembly of clause 4, wherein the first material is glass reinforced nylon.

Clause 6. The rotating assembly of any of clauses 2-5, wherein the second material includes a metal.

Clause 7. The rotating assembly of clause 6, wherein the metal is aluminum.

Clause 8. The rotating assembly of any of clauses 1-7, wherein the hub component has a cylindrical shape including a first circular end that contacts the first region and a second circular end that contacts the second region.

Clause 9. The rotating assembly of any of clauses 1-8, wherein the support is an annular ring that at least partially surrounds an outer periphery of the hub component.

Clause 10. The rotating assembly of any of clauses 1-9, wherein the hub component includes a shaft configured to rotate about the axis of rotation.

Clause 11. The rotating assembly of clause 10, wherein the hub component is a homogeneous single-piece component that includes the shaft.

Clause 12. The rotating assembly of any of clauses 1-11, further comprising first magnets attached to a fifth region of the first axial face, the fifth region being located radially outward from the third region with respect to the axis of rotation.

Clause 13. The rotating assembly of clause 12, further comprising second magnets attached to a sixth region of the second axial face, the sixth region being located radially outward from the fourth region with respect to the axis of rotation.

Clause 14. The rotating assembly of any of clauses 1-13, in combination with a stator positioned between the first rotor plate and the second rotor plate, the stator including one or more windings configured to generate magnetic flux when energized with current.

Clause 15. The rotating assembly of clause 14, wherein the stator has a generally planar configuration.

Clause 16. The rotating assembly of clause 14, wherein the stator includes a printed circuit board and the one or more windings include traces of the printed circuit board.

Clause 17. A method for forming a rotating assembly for an axial flux machine, comprising: positioning a hub component between a first region of a first axial face of a first rotor plate of an axial flux machine and a second region of a second axial face of a second rotor plate of the axial flux machine; and positioning a support between a third region of the first axial face and a fourth region of the second axial face, the third region being located radially outward from the first region with respect to an axis of rotation of the first rotor plate and the fourth region being located radially outward from the second region with respect to an axis of rotation of the second rotor plate.

Clause 18. The method of clause 17, wherein: the hub component is made of a first material; and the support is made of a second material that experiences substantially less creep than the first material when subjected to mechanical stress within a normal range of operating temperatures of the axial flux machine.

Clause 19. The method of clause 18, wherein the first material includes a polymer.

Clause 20. The method of clause 19, wherein the first material is a composite material with a polymer matrix.

Clause 21. The method of clause 20, wherein the first material is glass reinforced nylon.

Clause 22. The method of any of clauses 18-21, wherein the second material includes a metal.

Clause 23. The method of clause 22, wherein the metal is aluminum.

Clause 24. The method of any of clauses 17-23, wherein the hub component has a cylindrical shape including a first circular end that contacts the first region and a second circular end that contacts the second region.

Clause 25. The method of any of clauses 17-24, wherein the support is an annular ring that at least partially surrounds an outer periphery of the hub component.

Clause 26. The method of any of clauses 17-25, wherein the hub component includes a shaft configured to rotate about the axis of rotation.

Clause 27. The method of clause 26, further comprising: forming the hub component as a homogeneous single-piece component that includes the shaft.

Clause 28. The method of clause 27, wherein forming the hub component includes using an injection molding process to form the hub component that includes the shaft.

Clause 29. The method of any of clauses 17-28, further comprising: attaching first magnets to a fifth region of the first axial face, the fifth region being located radially outward from the third region with respect to the axis of rotation.

Clause 30. The method of clause 29, further comprising: attaching second magnets to a sixth region of the second axial face, the sixth region being located radially outward from the fourth region with respect to the axis of rotation.

Clause 31. The method of any of clauses 17-30, further comprising: positioning a stator between the first rotor plate and the second rotor plate, the stator including one or more windings configured to generate magnetic flux when energized with current.

Clause 32. The method of clause 31, wherein the stator has a generally planar configuration.

Clause 33. The method of clause 31, wherein the stator includes a printed circuit board and the one or more windings include traces of the printed circuit board.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A rotating assembly for an axial flux machine, comprising:

a first rotor plate configured to rotate about an axis of rotation;

a second rotor plate configured to rotate about the axis of rotation, the second rotor plate being oriented generally parallel to the first rotor plate;

a hub component extending between a first region of a first axial face of the first rotor plate and a second region of a second axial face of the second rotor plate; and a support contacting each of and extending between a third region of the first axial face and a fourth region of the second axial face, the third region being located radially outward from the first region with respect to the axis of rotation and the fourth region being located radially outward from the second region with respect to the axis of rotation.

2. The rotating assembly of claim 1, wherein:

the hub component is made of a first material; and the support is made of a second material that experiences substantially less creep than the first material when subjected to mechanical stress within a normal range of operating temperatures of the axial flux machine.

3. The rotating assembly of claim 2, wherein the first material includes a polymer.

4. The rotating assembly of claim 3, wherein the second material includes a metal.

5. The rotating assembly of claim 1, wherein the hub component has a cylindrical shape including a first circular end that contacts the first region and a second circular end that contacts the second region.

6. The rotating assembly of claim 5, wherein the support is an annular ring that at least partially surrounds an outer periphery of the hub component.

7. The rotating assembly of claim 1, wherein the hub component includes a shaft configured to rotate about the axis of rotation.

8. The rotating assembly of claim 7, wherein the hub component is a homogeneous single-piece component that includes the shaft.

9. The rotating assembly of claim 1, further comprising first magnets attached to a fifth region of the first axial face, the fifth region being located radially outward from the third region with respect to the axis of rotation.

10. The rotating assembly of claim 9, further comprising second magnets attached to a sixth region of the second axial face, the sixth region being located radially outward from the fourth region with respect to the axis of rotation.

11. The rotating assembly of claim 1, in combination with a stator positioned between the first rotor plate and the second rotor plate, the stator including one or more windings configured to generate magnetic flux when energized with current.

12. The rotating assembly of claim 11, wherein the stator includes a printed circuit board and the one or more windings include traces of the printed circuit board.

13. A method for forming a rotating assembly for an axial flux machine, comprising:

positioning a hub component between a first region of a first axial face of a first rotor plate of the axial flux machine and a second region of a second axial face of a second rotor plate of the axial flux machine; and positioning a support to contact each of and extend between a third region of the first axial face and a fourth region of the second axial face, the third region being located radially outward from the first region with respect to an axis of rotation of the first rotor plate and the fourth region being located radially outward from the second region with respect to an axis of rotation of the second rotor plate.

14. The method of claim 13, wherein:

the hub component is made of a first material; and the support is made of a second material that experiences substantially less creep than the first material when subjected to mechanical stress within a normal range of operating temperatures of the axial flux machine.

15. The method of claim 14, wherein the first material includes a polymer.

16. The method of any of claim 15, wherein the second material includes a metal.

17. The method of claim 13, wherein the hub component has a cylindrical shape including a first circular end that contacts the first region and a second circular end that contacts the second region.

18. The method of claim 17, wherein the support is an annular ring that at least partially surrounds an outer periphery of the hub component.

19. The method of claim 13, wherein the hub component includes a shaft configured to rotate about the axis of rotation.

20. The method of claim 19, further comprising:

forming the hub component as a homogeneous single-piece component that includes the shaft.

21. The method of claim 20, wherein forming the hub component includes using an injection molding process to form the hub component that includes the shaft.

22. The method of claim 13, further comprising:

positioning a stator between the first rotor plate and the second rotor plate, the stator including one or more windings configured to generate magnetic flux when energized with current.

23. The method of claim 22, wherein the stator includes a printed circuit board and the one or more windings include traces of the printed circuit board.

* * * * *